(12) United States Patent
Wu

(10) Patent No.: US 11,711,169 B2
(45) Date of Patent: Jul. 25, 2023

(54) BASE STATION DEVICE, AND TERMINAL DEVICE FOR RETRANSMITTING GROUP OF UNIT DATA

(71) Applicant: FUJITSU LIMITED, Kawasaki (JP)

(72) Inventor: Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/661,699

(22) Filed: Oct. 23, 2019

(65) Prior Publication Data

US 2020/0059325 A1 Feb. 20, 2020

Related U.S. Application Data

(63) Continuation of application No. PCT/JP2017/017064, filed on Apr. 28, 2017.

(51) Int. Cl.
*H04L 1/1806* (2023.01)
*H04L 1/1829* (2023.01)
(Continued)

(52) U.S. Cl.
CPC .......... *H04L 1/1806* (2013.01); *H04L 1/1854* (2013.01); *H04L 1/1874* (2013.01); *H04W 28/0278* (2013.01); *H04W 72/23* (2023.01)

(58) Field of Classification Search
CPC ... H04L 1/1806; H04L 1/1854; H04L 1/1874; H04L 47/6225; H04L 1/1614;
(Continued)

(56) References Cited

U.S. PATENT DOCUMENTS

2006/0198377 A1\* 9/2006 Kubota ................. H04L 1/1671
370/394
2007/0277074 A1 11/2007 Yeo et al.
(Continued)

FOREIGN PATENT DOCUMENTS

| JP | 2007520113 A | 7/2007 |
| WO | 2010/109521 A1 | 9/2010 |
| WO | 2010113214 A1 | 10/2010 |

OTHER PUBLICATIONS

Notice of Reasons for Refusal issued by the Japanese Patent Office for corresponding Japanese Patent Application No. 2019-515062, dated Jul. 13, 2020, with full English translation attached.
(Continued)

*Primary Examiner* — Rushil Parimal Sampat
(74) *Attorney, Agent, or Firm* — Myers Wolin, LLC

(57) ABSTRACT

A base station device includes: a storage that stores a group indicating unit data subject to retransmission out of predetermined number of unit data included in transmission data to be transmitted to a terminal device, and identification information to identify the group, in an associated manner; a receiver that receives, from the terminal device, identification information corresponding to transmission data transmitted to the terminal device; a communication controller that refers to the storage based on the received identification information, and that determines retransmission of unit data included in a group corresponding to the received identification information out of the transmission data; and a transmitter that transmits unit data included in the group determined to be retransmitted by the communication controller, to the terminal device.

7 Claims, 13 Drawing Sheets

(51) Int. Cl.
*H04L 1/1867* (2023.01)
*H04W 28/02* (2009.01)
*H04W 72/23* (2023.01)

(58) Field of Classification Search
CPC ............ H04L 1/1887; H04W 28/0278; H04W 72/042; H04W 72/1289; H04W 28/0268
See application file for complete search history.

(56) References Cited

U.S. PATENT DOCUMENTS

| | | | |
|---|---|---|---|
| 2012/0002657 A1 | 1/2012 | Seyama et al. | |
| 2012/0005550 A1 | 1/2012 | Ito | |
| 2015/0058700 A1* | 2/2015 | Yang | G06F 11/1012 714/773 |
| 2016/0036578 A1* | 2/2016 | Malladi | H04W 72/0413 370/329 |
| 2016/0150510 A1* | 5/2016 | Shao | H04L 1/1893 370/329 |
| 2016/0226643 A1* | 8/2016 | Mallik | H04L 1/1819 |
| 2018/0076992 A1* | 3/2018 | Nabetani | H04L 27/26 |
| 2019/0103951 A1* | 4/2019 | Park | H04W 72/14 |

OTHER PUBLICATIONS

3GPP TS 36.211 V14.2.0, "3rd Generation Partnership Project; Technical Specification Group Radio Access Network; Evolved Universal Terrestrial Radio Access (E-UTRA); Physical channels and modulation," (Release 14), Mar. 2017.

3GPP TS 36.212 V14.2.0, "3rd Generation Partnership Project; Technical Specification Group Radio Access Network; Evolved Universal Terrestrial Radio Access (E-UTRA); Multiplexing and channel coding," (Release 14), Mar. 2017.

3GPP TS 36.213 V14.2.0, "3rd Generation Partnership Project; Technical Specification Group Radio Access Network; Evolved Universal Terrestrial Radio Access (E-UTRA); Physical layer procedures," (Release 14), Mar. 2017.

3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," (Release 14), Mar. 2017.

3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification," (Release 14), Mar. 2017.

3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification," (Release 14), Mar. 2017.

3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification," (Release 14), Mar. 2017.

3GPP TS 36.331 V14.2.2, "3rd Generation Partnership Project; Technical Specification Group Radio Access Network; Evolved Universal Terrestrial Radio Access (E-UTRA); Radio Resource Control (RRC); Protocol specification," (Release 14), Apr. 2017, pp. 1-180.

3GPP TS 36.413 V14.2.0, "3rd Generation Partnership Project; Technical Specification Group Radio Access Network; Evolved Universal Terrestrial Radio Access Network (E-Utran); S1 Application Protocol (S1AP)," (Release 14), Mar. 2017, pp. 1-240.

3GPP TS 36.423 V14.2.0, "3rd Generation Partnership Project; Technical Specification Group Radio Access Network; Evolved Universal Terrestrial Radio Access Network (E-Utran); X2 application protocol (X2AP)," (Release 14), Mar. 2017.

* cited by examiner

FIG.5

| #M$_{CB}$ | Bit-mapping HARQ-ACK | | Multilevel HARQ-ACK | |
|---|---|---|---|---|
| | Pr$_{CBG\ Error}$ | Pr$_{ReTx}$ | Pr$_{CBG\ Error}$ | Pr$_{ReTx}$ |
| 0 | 0.6561 | 0 | 0.6561 | 0 |
| 1 | 0.2916 | 0.0729 | 0.2916 | 0.0729 |
| 2 | 0.0486 | 0.0243 | 0.0162 | 0.0081 |
| 3 | 0.0036 | 0.0027 | – | – |
| 4 | 0.0001 | 0.0001 | 0.0361 | 0.0361 |
| TOTAL | 1 | 0.1 | 1 | 0.1171 |

FIG.7

| #$M_{CB}$ | Bit-mapping HARQ-ACK | | Multilevel HARQ-ACK | |
|---|---|---|---|---|
| | $Pr_{CBG\ Error}$ | $Pr_{ReTx}$ | $Pr_{CBG\ Error}$ | $Pr_{ReTx}$ |
| 0 | 0.6561 | 0 | 0.6561 | 0 |
| 1 | 0.2916 | 0.0729 | 0.2916 | 0.0729 |
| 2 | 0.0486 | 0.0243 | – | – |
| 3 | 0.0036 | 0.0027 | 0.0423 | 0.0317 |
| 4 | 0.0001 | 0.0001 | 0.0361 | 0.01 |
| TOTAL | 1 | 0.1 | 1 | 0.1146 |

FIG.8

| #$M_{CB}$ | 4 bits | | 5 bits | | 6 bits | | 7 bits | |
|---|---|---|---|---|---|---|---|---|
| | $Pr_{CBG\,Error}$ | $Pr_{ReTx}$ | $Pr_{CBG\,Error}$ | $Pr_{ReTx}$ | $Pr_{CBG\,Error}$ | $Pr_{ReTx}$ | $Pr_{CBG\,Error}$ | $Pr_{ReTx}$ |
| 0 | 0.4305 | 0 | 0.4305 | 0 | 0.4305 | 0 | 0.4305 | 0 |
| 1 | 0.3826 | 0.0478 | 0.3826 | 0.0478 | 0.3826 | 0.0478 | 0.3826 | 0.0478 |
| 2 | 0.0319 | 0.0080 | 0.1169 | 0.0292 | 0.1488 | 0.0372 | 0.1488 | 0.0372 |
| 3 | | | | | 0.0154 | 0.0058 | 0.0331 | 0.0124 |
| 4 | | | | | | | 0.0022 | 0.0011 |
| 8 | 0.1550 | 0.1550 | 0.0700 | 0.0700 | 0.0227 | 0.0227 | 0.0028 | 0.0028 |
| TOTAL | 1 | 0.2108 | 1 | 0.1470 | 1 | 0.1135 | 1 | 0.1013 |
| OH REDUCTION RATE | – | 100% | – | 37.5% | – | 25% | – | 12.5% |

FIG.10

| #M$_{CB}$ | Multilevel HARQ-ACK | | Suboptimal Multilevel HARQ-ACK | |
|---|---|---|---|---|
| | Pr$_{CBG\ Error}$ | Pr$_{ReTx}$ | Pr$_{CBG\ Error}$ | Pr$_{ReTx}$ |
| 0 | 0.4305 | 0 | 0.4305 | 0 |
| 1 | 0.3826 | 0.0478 | 0.3826 | 0.0478 |
| 2 | 0.0319 | 0.0080 | – | – |
| 3 | – | – | 0.1116 | 0.0558 |
| 4 | 0.1550 | 0.1550 | 0.0753 | 0.0753 |
| TOTAL | 1 | 0.2108 | 1 | 0.1789 |

FIG.13

| #$M_{CB}$ | Bit-mapping HARQ-ACK | | Multilevel HARQ-ACK | |
|---|---|---|---|---|
| | $Pr_{CBG\ Error}$ | $Pr_{ReTx}$ | $Pr_{CBG\ Error}$ | $Pr_{ReTx}$ |
| 0 | 0.6561 | 0 | 0.6561 | 0 |
| 1 | 0.2916 | 0.0729 | – | – |
| 2 | 0.0486 | 0.0243 | 0.3078 | 0.1539 |
| 3 | 0.0036 | 0.0027 | – | – |
| 4 | 0.0001 | 0.0001 | 0.0361 | 0.0361 |
| TOTAL | 1 | 0.1 | 1 | 0.19 |

BASE STATION DEVICE, AND TERMINAL DEVICE FOR RETRANSMITTING GROUP OF UNIT DATA

CROSS-REFERENCE TO RELATED APPLICATION

This application is a continuation of International Application No. PCT/JP2017/017064, filed on Apr. 28, 2017, the entire contents of which are incorporated herein by reference.

FIELD

The embodiments discussed herein are related to a base station device, a terminal device, a wireless communication system, and a communication method.

BACKGROUND

In current networks, traffic of mobile terminals (smartphones and feature phones) use most of the resources of the networks. Moreover, the traffic of mobile phones is on the increasing trend in the future also.

On the other hand, with the development of IoT (Internet of things) services (for example, transportation systems, smart meters, monitoring systems of devices, and the like), it is desired to support services with various requirements. Therefore, for communication standards of a next generation (for example, the 5th generation mobile communication system (5G)), there is a demand for techniques for achieving higher data rate, increased capacity, and lower delay, in addition to the standard techniques (for example, 3GPP TS 36.211 V14.2.0 (2017-03), 3GPP TS 36.212 V14.2.0 (2017-03), 3GPP TS 36.213 V14.2.0 (2017-03), 3GPP TS 36.300 V14.2.0 (2017-03), 3GPP TS 36.321 V14.2.0 (2017-03), 3GPP TS 36.322 V14.0.0 (2017-03), 3GPP TS 36.323 V14.2.0 (2017-03), 3GPP TS 36.331 V14.2.1 (2017-03), 3GPP TS 36.413 V14.2.0 (2017-03), 3GPP TS 36.423 V14.2.0 (2017-03), 3GPP TS 36.425 V14.0.0 (2017-03)) of the 4th generation mobile communication (4G). As for the next generation communication standard, a task force of 3GPP (for example, TSG-RAN WG1, TSG-RAN WG2, and the like) has been conducting a technical study (3GPP TR 38.801 V14.0.0 (2017-03), 3GPP TR 38.802 V14.0.0 (2017-03), 3GPP TR 38.803 V14.0.0 (2017-03), 3GPP TR 38.804 V14.0.0 (2017-03), 3GPP TR 38.900 V14.2.0 (2016-12), 3GPP TR 38.912 V14.0.0 (2017-03), 3GPP TR 38.913 V14.2.0 (2017-03)).

As described above, in 5G, support of many use cases categorized into enhanced mobile broadband (eMBB), massive machine type communications (MTC), and ultra-reliable and low latency communication (URLLC) are assumed to support various types of services.

Moreover, in LTE (4th generation communication system) and the like, a technique of hybrid automatic repeat request (HARQ) is adopted to achieve effective data transmission. In HARQ, a reception device requests a transmission device for retransmission of data that has not been decoded properly by processing in a layer 1 protocol layer of LTE, and the like. When receiving the request for retransmission of data, the transmission device transmits retransmission data corresponding to the retransmission request of data that has not been decoded properly in the reception device. The reception device combines the data that has not been decoded properly and the retransmission data, to perform decoding of the data. Thus, the highly efficient and highly accurate retransmission control is achieved.

Furthermore, as a new feedback in HARQ, it is regulated that a transport block is divided into code block groups and the HARQ feedback is performed in a unit of the code block group (3GPP TR 38.802 V14.0.0 (2017-03)).

Also in a code block group, for example, in a case in which the number of code blocks increases to a large number, the retransmission efficiency is not improved because all of the code blocks in the code block group are to be retransmitted if a single error code block in the group includes an error. Moreover, for example, if the number of blocks in a code block group is decreased to a small number, the number of groups increases and, therefore, the number of bits to be used in the HARQ feedback increases, to increase the overhead.

SUMMARY

According to an aspect of an embodiment, a base station device includes: a storage that stores a group indicating unit data subject to retransmission out of predetermined number of unit data included in transmission data to be transmitted to a terminal device, and identification information to identify the group, in an associated manner; a receiver that receives, from the terminal device, identification information corresponding to transmission data transmitted to the terminal device; a communication controller that refers to the storage based on the received identification information, and that determines retransmission of unit data included in a group corresponding to the received identification information out of the transmission data; and a transmitter that transmits unit data included in the group determined to be retransmitted by the communication controller, to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a retransmission rate in the example of the first feedback table;
FIG. 7 illustrates a retransmission rate in the example of the second feedback table;
FIG. 8 illustrates a retransmission rate when eight CBs are included in one TB;
FIG. 10 illustrates a retransmission rate in the example of the third feedback table;
FIG. 13 illustrates a retransmission rate in one example of a processing result of the optimal multilevel CBG search.

DESCRIPTION OF EMBODIMENTS

Preferred embodiments of the present invention will be explained with reference to accompanying drawings.

Figure 1:
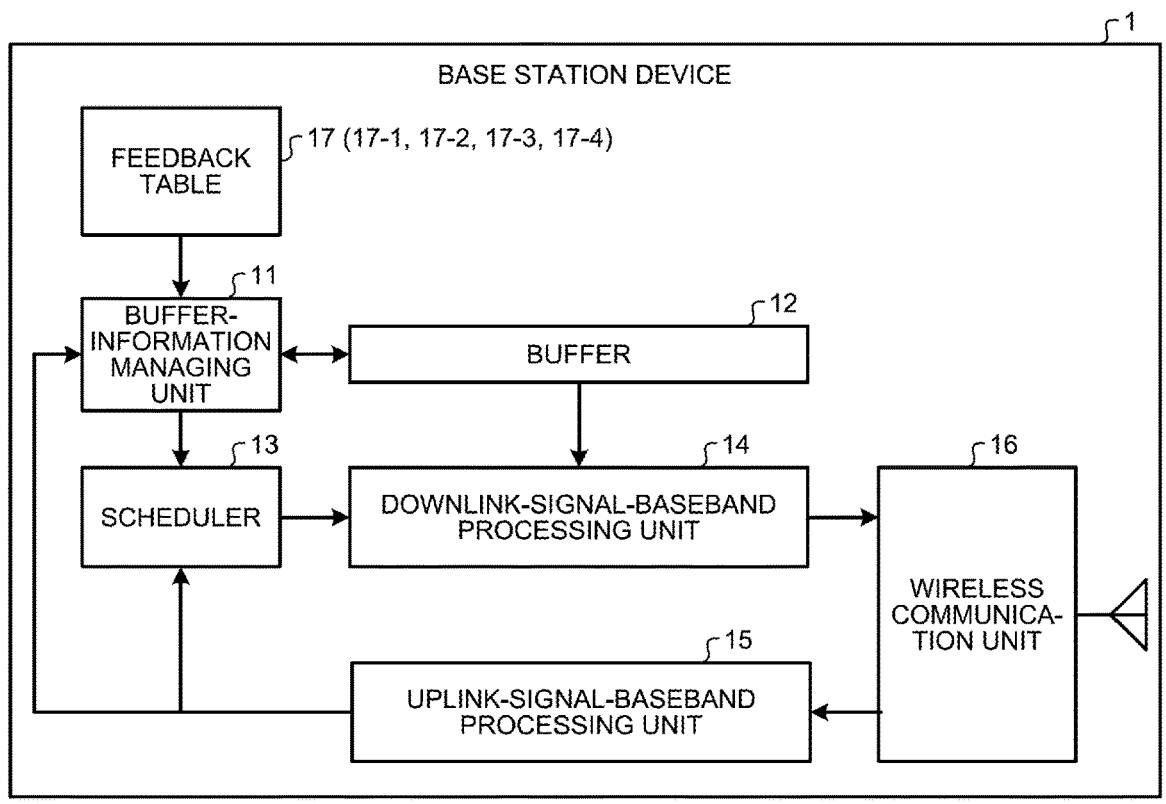
FIG. 1 illustrates an example of a base station device.
Figure 2:
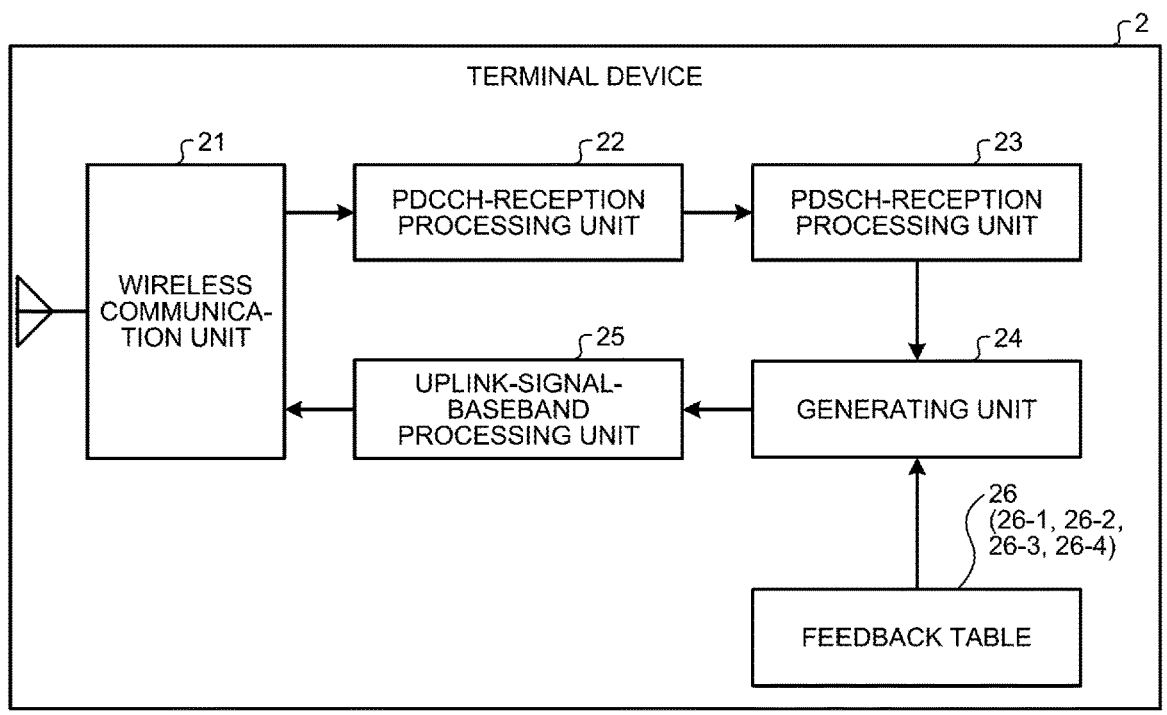
FIG. 2 illustrates an example of a terminal device.

FIG. 1 illustrates an example of a base station device. FIG. 2 illustrates an example of a terminal device. In a wireless communication system, a base station device 1 and a terminal device 2 communicate data by wireless communication.

Base Station Device

The base station device 1 includes a buffer-information managing unit 11, a buffer 12, a scheduler 13, a downlink-signal-baseband processing unit 14, an uplink-signal-baseband processing unit 15, a wireless communication unit 16, and a feedback table 17. The feedback table 17 is an example of a storage unit that is stored in a predetermined storage device.

The buffer-information managing unit 11 receives data that is transmitted from a higher level device not illustrated to the terminal device 2. The buffer-information-managing unit 11 performs buffering of the data input separated into logical channels according to the quality of service (QoS)

The buffer 12 is a temporary storage region of transmission data that is acquired by the base station device 1 and that is to be transmitted to the terminal device 2. For example, the buffer 12 temporarily stores transmission data in a unit of a transport block (TB) (hereinafter, "TB"), which is a transmission unit of transmission data. The base station device 1 handles the transmission data in a unit of TB. The buffer 12 may include plural buffers according to a type of data. The buffer-information managing unit 11 stores data to be transmitted in the buffer 12. The buffer-information managing unit 11 then acquires a state of the data stored in the buffer 12, and notifies the scheduler 13 about the state.

A single TB includes plural code blocks (CB) (hereinafter, "CB"). Moreover, in the present embodiment, a group including one or more CBs to be retransmitted to the terminal device 2 from the base station device 1 is referred to as a code block group (CBG) (hereinafter, "CBG").

The scheduler 13 receives the notification about the state of the data stored in the buffer 12 from the buffer-information managing unit 11. When transmitting the data, the scheduler 13 identifies data to be transmitted from among data stored in the buffer 12, according to precedence, such as the QoS. Moreover, the scheduler 13 determines the size of TB, a modulation and coding scheme (MCS) to be used, and a wireless resource.

The scheduler 13 receives an "HARQ-ACK bit" per TB from the terminal device 2. The "HARQ-ACK bit" is identification information to identify a CBG in a TB.

The base station device 1 divides a TB into CBs, the respective maximum sizes of which are a predetermined size (for example, 6144 bits), when the size of the TB exceeds a predetermined size (for example, 75376 bits for one-layer TB, and 149776 bits for a two-layer TB), and performs encoding.

Figure 3:
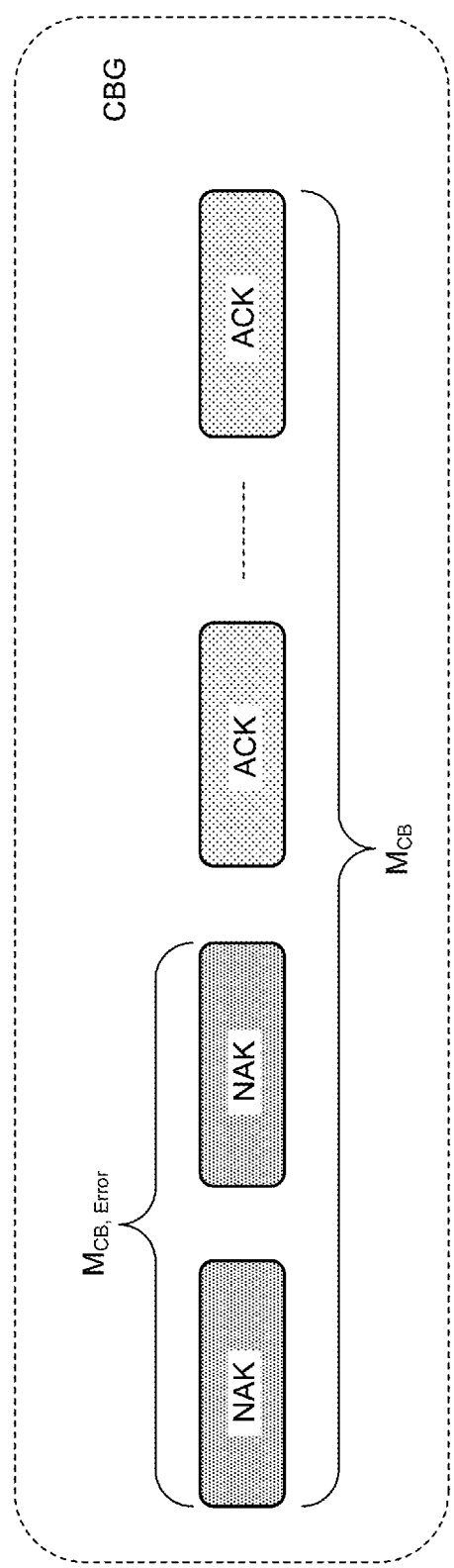
FIG. 3 illustrates an example of CBs that have resulted in ACK and NAK included in a CBG.

FIG. 3 illustrates an example of CBs that have resulted in ACK and NAK included in a CBG. In the present embodiment, the "ACK (acknowledgement)" is transmitted from the base station device 1, and indicates a CB received normally by the terminal device 2. Moreover, the "NAK (negative acknowledgement)" is transmitted from the base station device 1, and indicates a CB that is not received normally by the terminal device 2. The number of CBs included in a single CBG is $M_{CB}$. Furthermore, in the following, the number of CBs having a reception error (that is, NAK) in one CBG is $M_{CB,\ Error}$. $M_{CB}$ pieces of CBs include $M_{CB,\ Error}$ pieces of CBs having a reception error, and $M_{CB} \geq C_{CB,\ Error}$ holds. The example in FIG. 3 illustrates a case in which the first $M_{CB,\ Error}=2$ pieces of CBs in a CBG including $M_{CB}$ pieces of CBs have a reception error.

Moreover, in the following, a probability that one CBG including $M_{CB}$ pieces of CBs has $M_{CB,\ Error}$ pieces of CBs having a reception error (that is NAK) is $\Pr_{CBG\ Error}$ ($M_{CB,\ Error}$, $M_{CB}$). Furthermore, a probability that one CB has a reception error is p (for example, P=0.1). Accordingly, $\Pr_{CBG\ Error}$ ($M_{CB,\ Error}$, $M_{CB}$) is expressed as in Equation (1) below. Assuming that CBs having a reception error in the same TB are independent and identically-distributed (IID), it can be modeled in a binomial distribution.

$$\Pr_{CBG\ Error}(M_{CB,Error}, M_{CB}) = \binom{M_{CB}}{M_{CB,Error}} \cdot p^{M_{CB,Error}} \cdot (1-p)^{M_{CB}-M_{CB,Error}} \qquad (1)$$

The first factor on the right side of above Equation (1) indicates the number of combinations when selecting $M_{CB,\ Error}$ pieces from the number of $M_{CB}$ pieces. From above Equation (1), an average probability $\Pr_{CBG\ Error}$ ($M_{CB}$) of occurrence of a reception error (that is, NAK) in one CBG including $M_{CB}$ pieces of CBs is expressed as in Equation (2) below.

$$\Pr_{CBG\ Error}(M_{CB}) = \sum_{k=1}^{M_{CB}} \Pr_{CBG\ Error}(k, M_{CB}) = \sum_{k=1}^{M_{CB}} \binom{M_{CB}}{k} \cdot p^k \cdot (1-p)^{M_{CB}-k} \qquad (2)$$

The downlink-signal-baseband processing unit 14 receives information about data to be transmitted or retransmitted, information about MCS, control information, and information about a wireless resource to be used from the scheduler 13. The downlink-signal-baseband processing unit 14 then acquires data according to the information about the data to be transmitted or retransmitted from the buffer 12. The downlink-signal-baseband processing unit 14 subjects the acquired data and the control information to encoding processing by using an encoding rate specified in the received information about MCS.

Furthermore, the downlink-signal-baseband processing unit 14 subjects the acquired data and the control data to modulation processing by using a modulation method specified in the received information about MCS. Thereafter, the downlink-signal-baseband processing unit 14 allocates the control information and the data to a specified wireless resource, arranges the control information in a physical downlink control channel (PDCCH), and arranges the data in a physical downlink shared channel (PDSCH). The downlink-signal-baseband processing unit 14 then outputs the control information and the data to the wireless communication unit 16.

The wireless communication unit 16 receives the control data and the data from the downlink-signal-baseband processing unit 14. The wireless communication unit 16 subjects the control data and the data to digital-to-analog (DA) conversion. Furthermore, the wireless communication unit 16 transmits a control signal and the data to the terminal device 2 through an antenna by using the allocated wireless resource.

Moreover, the wireless communication unit 16 receives a signal of "HARQ-ACK bit" stored in an "HARQ-ACK payload" transmitted through the antenna, from the terminal device 2. The "HARQ-ACK bit" is index information to identify a CBG included in a transmitted TB unit. The "HARQ-ACK payload" is a data region storing the "HARQ-ACK bit". The wireless communication unit 16 subjects the received signal of "HARQ-ACK bit" to AD conversion. Thereafter, the wireless communication unit 16 outputs the received signal of "HARQ-ACK bit" to the uplink-signal-baseband processing unit 15.

The uplink-signal-baseband processing unit 15 subjects the signal of "HARQ-ACK bit" received from the wireless communication unit 16 to demodulation processing and decoding processing, to acquire an "HARQ-ACK bit". The uplink-signal-baseband processing unit 15 then outputs the acquired "HARQ-ACK bit" to the scheduler 13 and the buffer-information managing unit 11.

The buffer-information managing unit 11 refers to the feedback table 17 based on the "HARQ-ACK bit" received from the uplink-signal-baseband processing unit 15. That is, the buffer-information managing unit 11 acquires "information of CBG subject to retransmission" corresponding to the "HARQ-ACK bit" from the feedback table 17.

The buffer-information managing unit 11 notifies the downlink-signal-baseband processing unit 14 about the "information of CBG subject to retransmission" read from the feedback table 17. The downlink-signal-baseband processing unit 14 refers to the buffer 12 based on the "information about CBG subject to retransmission" notified by the buffer-information managing unit 11, to acquire the CBG subject to retransmission, and retransmits it to the terminal device 2 through the wireless communication unit 16.

Terminal Device

The terminal device 2 includes a wireless communication unit 21, a PDCCH-reception processing unit 22, a PDSCH-reception processing unit 23, a generating unit 24, an uplink-signal-baseband processing unit 25, and a feedback table 26. The feedback table 26 is an example of a storage unit that is stored in a predetermined storage device.

The wireless communication unit 21 receives signals of PDCCH and PDSCH including a control signal and data through an antenna from the base station device 1. The wireless communication unit 21 subjects the received signals to AD conversion. Thereafter, the wireless communication unit 21 outputs the received signals of PDCCH and PDSCH to the PDCCH-reception processing unit 22.

Moreover, the wireless communication unit 21 receives a signal of "HARQ-ACK bit" from the uplink-signal-baseband processing unit 25. The wireless communication unit 21 subjects the signal of "HARQ-ACK bit" to DA conversion, to acquire a signal of "HARQ-ACK bit". Thereafter, the wireless communication unit 21 transmits the signal of "HARQ-ACK bit" to the base station device 1 through the antenna.

The PDCCH-reception processing unit 22 receives signals of PDCCH and PDSCH including a control signal and data from the wireless communication unit 21. The PDCCH-reception processing unit 22 subjects the signal of PDCCH to demodulation processing and decoding processing, to acquire a control signal. The PDCCH-reception processing unit 22 then outputs the signal of PDSCH to the PDSCH-reception processing unit 23 together with the control signal.

The PDSCH-reception processing unit 23 receives the signal of PDSCH together with the control signal from the PDCCH-reception processing unit 22. The PDSCH-reception processing unit 23 subjects the signal of PDCCH to demodulation processing and decoding processing per CB by using the MCS specified in the control signal, to acquire data.

The PDSCH-reception processing unit 23 then determines whether data has been decoded normally per CB of a reception TB received from the base station device 1. For a CB, data of which has been successfully decoded in the reception TB, the PDSCH-reception processing unit 23 notifies of successful decoding of data to the generating unit 24. On the other hand, for a CB, data of which has failed to be decoded in the reception TB, the PDSCH-reception processing unit 23 notifies of unsuccessful decoding of data to the generating unit 24.

When receiving the notification indicating whether decoding of data per CB in the reception TB is succeeded from the PDSCH-reception processing unit 23, the generating unit 24 generates a "pattern of information indicating ACK/NAK". The "pattern of information indicating ACK/NAK" is a pattern in which pieces of feedback information of ACK or NAK of each CB included in the received TB are arrange in a transmission sequence. The generating unit 24 refers to the feedback table 26 based on the generated "pattern of information indicating ACK/NAK", and acquires an "HARQ-ACK bit" corresponding to the "pattern of information indicating ACK/NAK". The generating unit 24 then outputs the acquired "HARQ-ACK bit" to the uplink-signal-baseband processing unit 25.

The uplink-signal-baseband processing unit 25 subjects the received "HARQ-ACK bit" to encoding processing and modulation processing. The uplink-signal-baseband processing unit 25 arranges data subjected to the encoding processing and the modulation processing in a physical uplink control channel (PUCCH), and generates a signal of "HARQ-ACK bit". The uplink-signal-baseband processing unit 25 then outputs the generated signal of "HARQ-ACK bit" to the wireless communication unit 21.

Example of First Feedback Table

Figure 4:
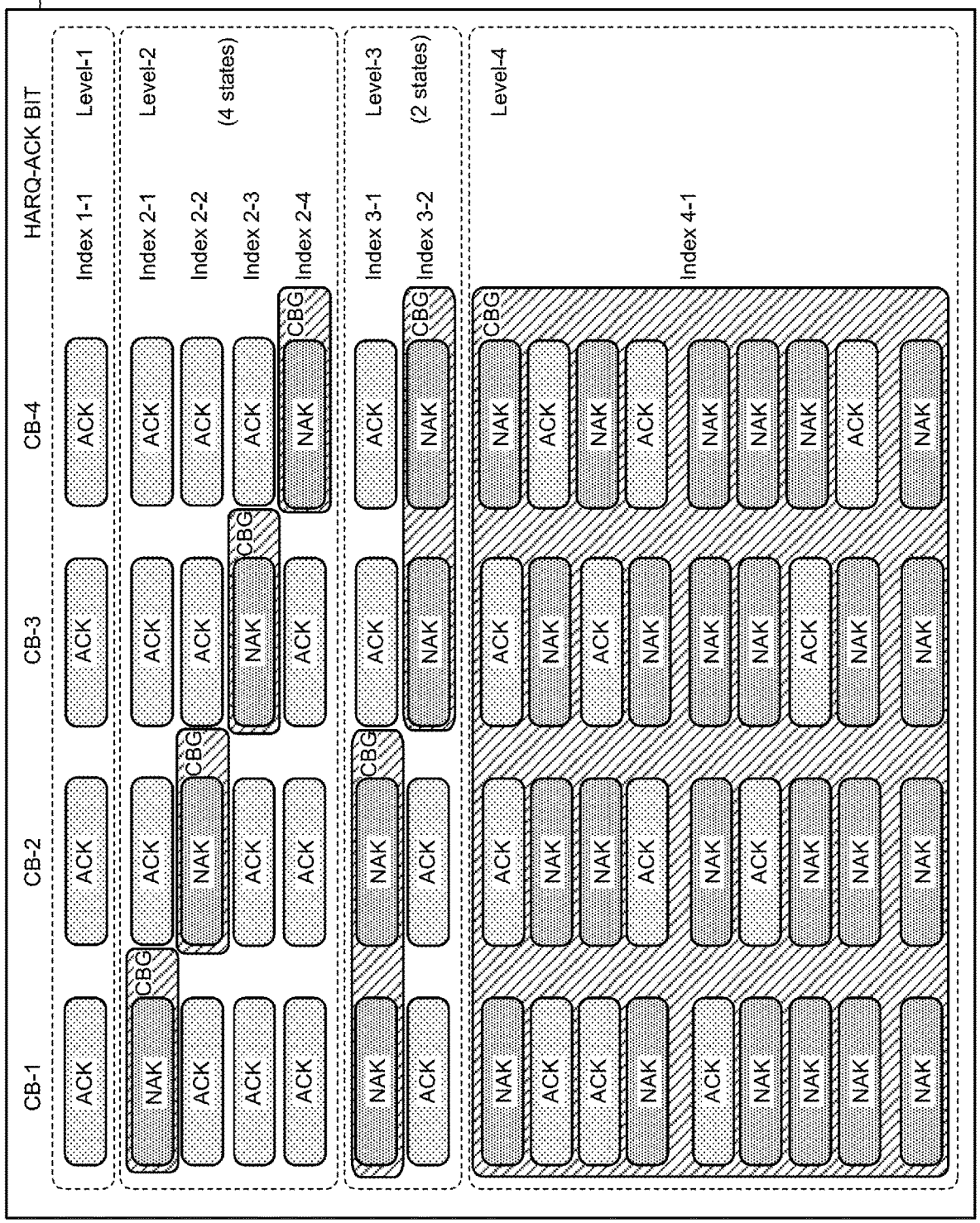
FIG. 4 illustrates an example of a first feedback table.

FIG. 4 illustrates an example of a first feedback table. Feedback tables 17-1, 26-1 according to the first example are tables stored as the feedback table 17 in the base station device 1, and as the feedback table 26 in the terminal device 2. The feedback tables 17-1, 26-1 illustrate an example in which four CBs of CB-1 to CB-4 form a TB of a transmission unit. In the following, in the illustration of a feedback table, plural CBs in a row unit form one TB.

In the feedback tables 17-1, 26-1, a layer in which any of CB-1 to CB-4 is not included in a CBG to be retransmitted is a layer of "Level-1". The layer of "Level-1" has only one type of status in which a CBG including a CB subject to retransmission is not present. In the feedback tables 17-1, 26-1, to this one type of status, "HARQ-ACK bit" "Index 1-1" is assigned.

Moreover, in the feedback tables 17-1, 26-1, a layer in which either CB out of CB-1 to CB-4 is included in a CBG as a CB subject to retransmission is a layer of "Level-2". The layer of "Level-2" has four types of statuses in which a CBG including either one CB out of CB-1 to CB-4 is present. For example, to a status in which only CB-1 is included in a CBG as a CB subject to retransmission, and CB-2 to CB-4 are not subject to retransmission, "HARQ-ACK" "Index 2-1" is assigned. "Index 2-2" to "Index 2-4" in FIG. 4 are also assigned similarly to "Index 2-1".

Furthermore, in the feedback tables 17-1, 26-1, a layer in which CB-1 to CB-2, or CB-3 to CB-4 are included in a CBG as CBs subject to retransmission is a layer of "Level-3". For example, to a status in which CB-1 to CB-2 are included in a CBG as CBs subject to retransmission, and CB-2 to CB-4 are not subject to retransmission, "HARQ-ACK bit" "Index 3-1" is assigned. "Index 3-2" in FIG. 4 is also assigned similarly to "Index 3-1".

Moreover, in the feedback tables 17-1, 26-1, a layer that corresponds to none of above "Level-1" to "Level-3", and in which all of CB-1 to CB-4 are subject to retransmission and included in a CBG subject to retransmission is a layer of "Level-4". The layer of "Level-4" has only one type of status in which all of CB-1 to CB-4 are included in a CBG subject to retransmission. In the feedback tables 17-1, 26-1, to this one type of status, "HARQ-ACK bit" "Index 4-1" is assigned.

Specifically, in the feedback tables 17-1, 26-1, for example, in a TB corresponding to "Index 1-1" of "Level-1" indicated in the first row, all of CB-1 to CB-4 are "ACK". When it is in this ACK/NAK pattern, because any of CBs is not grouped as a CBG subject to retransmission, a CB to be retransmitted is not present.

Moreover, in the feedback tables 17-1, 26-1, for example, in a TB corresponding to "Index 2-1" of "Level-2" indicated in the second row, CB-1 to CB-4 are "NAK", "ACK", "ACK", "ACK", respectively. When it is in this ACK/NAK pattern, because CB-1 is grouped as a CBG subject to retransmission, only CB-1 is retransmitted.

Furthermore, in the feedback tables 17-1, 26-1, for example, in a TB corresponding to "Index 3-1" of "Level-3" indicated in the sixth row, CB-1 to CB-4 are "NAK", "NAK", "ACK", "ACK", respectively. When it is in this ACK/NAK pattern, because CB-1 and CB-2 adjacent to each other are grouped as a CBG subject to retransmission, CB-1 and CB-2 are retransmitted.

Moreover, in the feedback tables 17-1, 26-1, for example, in a TB corresponding to "Index 4-1" of "Level-4" indicated in the eighth row, CB-1 to CB-4 are "NAK", "ACK", "ACK", "NAK", respectively. When it is in this ACK/NAK pattern, because all of CB-1 to CB-4 are grouped as a CBG subject to retransmission, all of adjacent CB-1 to CB-4 are retransmitted.

As described, to identify a status among $8=2^3$ statuses of "Index 1-1" to "Index 4-1" in multiple levels of "Level-1" to "Level-4", the "HARQ-ACK payload" of 3 bits is used. That is, by using a "HARQ-ACK bit" stored in the "HARQ-ACK payload" of 3 bits, a CBG subject to retransmission in a TB of a transmission unit can be identified. According to the feedback tables 17-1, 26-1 according to the first example of the embodiment, by adding a 3-bit overhead to data to be transmitted to the base station device 1 from the terminal device 2, the retransmission rate of transmission data can be reduced.

In FIG. 4, in both of the feedback tables 17-1, 26-1, it is indicated that respective CB-1 to CB-4 in each TB are either "ACK" or "NAK". However, because the base station device 1 only needs to recognize the "information of CBG subject to retransmission" corresponding to each Index, distinction between "ACK" and "NAK" of each of CB-1 to CB-4 in the feedback table 17-1 can be omitted. When the distinction is omitted, in the feedback table 17-1, one TB having a CBG including CB-1 to CB-2 corresponds to "Index 3-1". "Index 3-2", "Index 3-3", and "Index 4-1" are also the same.

Retransmission Rate in Example of First Feedback Table

FIG. 5 illustrates a retransmission rate in the example of the first feedback table. $M_{CB}$ indicates the number of CBs included in one CBG, and M indicates the total number of CBs included in a TB of a transmission unit. Furthermore, a probability $Pr_{ReTX}$ of occurrence of a CB to be retransmitted in one CBG is defined as Equation (3) below by using $Pr_{CBG\ Error}$ ($M_{CB,\ Error}$, $M_{CB}$) (refer to Equation (1) described above).

$$Pr_{ReTx} = \frac{M_{CB} \times Pr_{CBG\ Error}(M_{CB,Error}, M_{CB})}{M} \quad (3)$$

As illustrated in FIG. 5, $Pr_{CBG\ Error}$ and $Pr_{ReTX}$ are compared for each number of retransmission CBs (# $M_{CB}$) in a CBG between a comparison method, "Bit-mapping HARQ-ACK" and "Multilevel HARQ-ACK", which is a method of the present embodiment using the feedback tables 17-1, 26-1. Because a bit indicating ACK/NAK is arranged per CB in "Bit-mapping HARQ-ACK", the number of bits of the "HARQ-ACK payload" is to be 4 bits when four CBs of CB-1 to CB-4 are a transmission unit. On the other hand, as described above, in "Multilevel HARQ-ACK", the number of bits of the "HARQ-ACK payload" is to be 3 bits.

As illustrated in FIG. 5, while the total retransmission rate $Pr_{ReTX}$ of the Bit-mapping HARQ-ACK" is 0.1, the retransmission rate $Pr_{ReTX}$ of the "Multilevel HARQ-ACK" is 0.1171 to be higher in retransmission rate by 1.71%. That is, according to the example of the first feedback table of the embodiment, while suppressing the retransmission rate to be worsened only by 1.71%, the number of bits of the "HARQ-ACK payload" can be reduced by 25%, to be 3 bits. Therefore, while suppressing worsening of the transmission rate, the number of bits of the "HARQ-ACK payload" to be an overhead of communicated data can be reduced.

Example of Second Feedback Table

Figure 6:
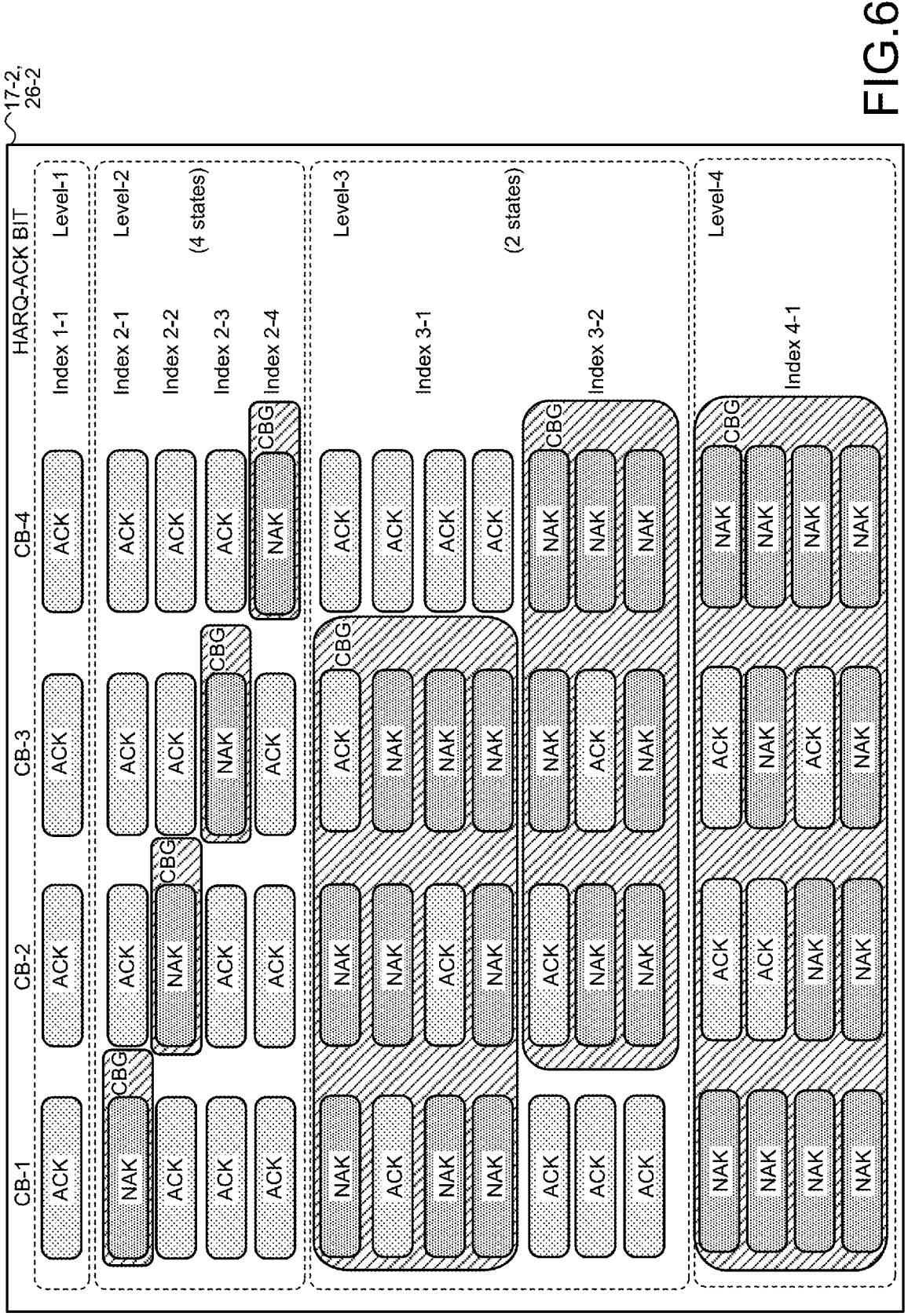
FIG. 6 illustrates an example of a second feedback table.

FIG. 6 illustrates an example of a second feedback table. Feedback tables 17-2, 26-2 according to the second example are tables stored as the feedback table 17 in the base station device 1, and as the feedback table 26 in the terminal device 2. The feedback tables 17-2, 26-2 illustrate an example in which four CBs of CB-1 to CB-4 form a TB of a transmission unit.

Layers of "Level-1" and "Level-2" in the feedback tables 17-2, 26-2 are similar to the feedback tables 17-1, 26-1 illustrated in FIG. 4.

Furthermore, in the feedback tables 17-2, 26-2, a layer in which at least two CBs out of CB-1 to CB-3, or at least two CBs out of CB-2 to CB-4 are included in a CBG as CBs subject to retransmission is a layer of "Level-3". For example, to a status in which CB-1 to CB-3 are included in a CBG as CBs subject to retransmission, and CB-4 is not subject to retransmission, "HARQ-ACK bit" "Index 3-1" is assigned. "Index 3-2" in FIG. 6 is also assigned similarly to "Index 3-1".

Moreover, in the feedback tables 17-2, 26-2, a layer that corresponds to none of above "Level-1" to "Level-3", and in which all of CB-1 to CB-4 are subject to retransmission and included in a CBG subject to retransmission is a layer of "Level-4". The layer of "Level-4" has only one type of status in which all of CB-1 to CB-4 are included in a CBG subject to retransmission. In the feedback tables 17-2, 26-2, to this one type of status, "HARQ-ACK bit" "Index 4-1" is assigned.

Specifically, in the feedback tables 17-2, 26-2, for example, in a TB corresponding to "Index 1-1" of "Level-1" indicated in the first row, all of CB-1 to CB-4 are "ACK". When it is in this ACK/NAK pattern, because any of CBs is not grouped as a CBG subject to retransmission, a CB to be retransmitted is not present.

Moreover, in the feedback tables 17-2, 26-2, for example, in a TB corresponding to "Index 2-1" of "Level-2" indicated in the second row, CB-1 to CB-4 are "NAK", "ACK", "ACK", "ACK", respectively. When it is in this ACK/NAK pattern, because CB-1 is grouped as a CBG subject to retransmission, only CB-1 is retransmitted.

Furthermore, in the feedback tables 17-2, 26-2, for example, in a TB corresponding to "Index 3-1" of "Level-3" indicated in the sixth row, CB-1 to CB-4 are "NAK", "NAK", "ACK", "ACK", respectively. When it is in this ACK/NAK pattern, because adjacent CB-1 to CB-3 are grouped as a CBG subject to retransmission, CB-1 to CB-3 are retransmitted.

Moreover, in the feedback tables 17-2, 26-2, for example, in a TB corresponding to "Index 4-1" of "Level-4" indicated in the thirteenth row, CB-1 to CB-4 are "NAK", "ACK", "ACK", "NAK", respectively. When it is in this ACK/NAK pattern, because all of adjacent CB-1 to CB-4 are grouped as a CBG subject to retransmission, all of CB-1 to CB-4 are retransmitted.

In FIG. 6, in both of the feedback tables 17-2, 26-2, it is indicated that respective CB-1 to CB-4 in each TB are either "ACK" or "NAK". However, similarly to FIG. 4, distinction between "ACK" and "NAK" of each of CB-1 to CB-4 in the feedback tables 17-2 can be omitted. When the distinction is omitted, in the feedback table 17-2, one TB having a CBG including CB-1 to CB-3 corresponds to "Index 3-1". "Index 3-2" and "Index 4-1" are also the same.

Retransmission Rate in Example of Second Feedback Table

FIG. 7 illustrates a retransmission rate in the example of the second feedback table. As illustrated in FIG. 7, $Pr_{CBG\ Error}$ and $Pr_{ReTX}$ are compared for each number of retransmission CBs (# $M_{CB}$) in a CBG between a comparison method, "Bit-mapping HARQ-ACK" and "Multilevel HARQ-ACK", which is a method of the present embodiment using the feedback tables 17-2, 26-2. In "Multilevel HARQ-ACK", the number of bits of the "HARQ-ACK payload" is to be 3 bits, similarly to when using the feedback tables 17-1, 26-1.

Furthermore, as illustrated in FIG. 7, while the total retransmission rate $Pr_{ReTX}$ of the Bit-mapping HARQ-ACK" is 0.1, the retransmission rate $Pr_{ReTX}$ of the "Multilevel HARQ-ACK" is 0.1146 to be higher in retransmission rate by 1.46%. Moreover, according to the example of the second feedback table of the embodiment, the retransmission rate is improved to be better than the retransmission rate, 0.1171 of the example of the first feedback table of the embodiment. However, such an improvement becomes more significant as the number of CBs in a TB or the total number of CBs included in a TB increases.

Retransmission Rate when Eight CBs are Included in One TB

FIG. 8 illustrates a retransmission rate when eight CBs are included in one TB. FIG. 8 illustrates a retransmission rate and a tradeoff relationship between a "HARQ-ACK payload" and an overhead (OH) when the number of bits of the "HARQ-ACK payload" is changed from 4 bits to 7 bits, assuming that eight CBs are included in one TB.

According to FIG. 8, as the number of bits of the "HARQ-ACK payload" is increased as 4 bits, 5 bits, 6 bits, to 7 bits, the retransmission rate decreases as 0.2108, 0.1470, 0.1135, to 0.1013. A reduction rate of the overhead decreases as 100%, 37.5%, 25%, to 12.5%. However, when it is compared with the retransmission rate $Pr_{ReTx}$=0.1 in the comparison method, "Bit-mapping HARQ-ACK", it is found that the overhead decreases although the retransmission rate increases.

Example of Third Feedback Table

Figure 9:
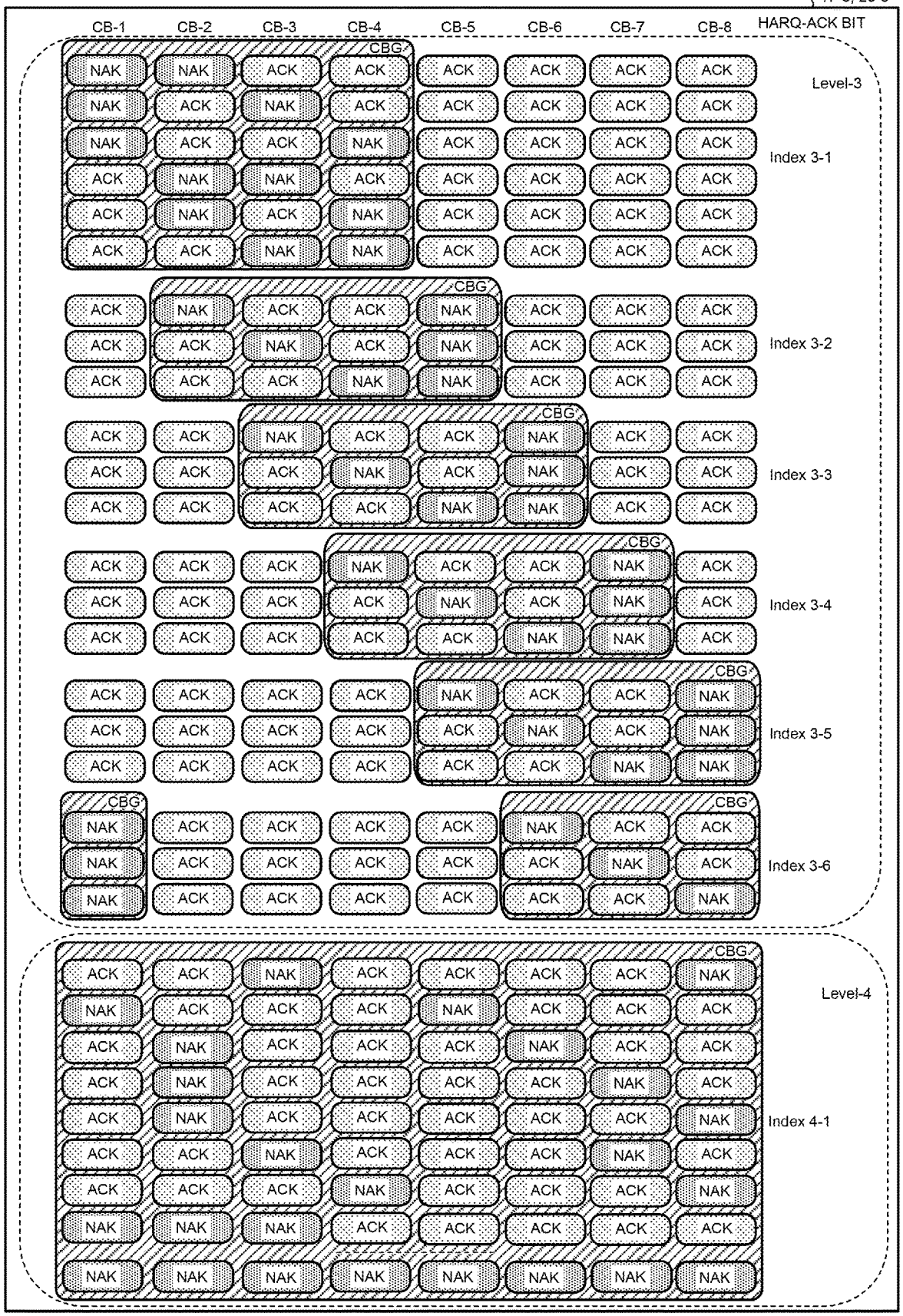
FIG. 9 illustrates an example of a third feedback table.

FIG. 9 illustrates an example of a third feedback table. In FIG. 9, description of "Level-1" and "Level-2" is omitted. Feedback tables 17-3, 26-3 according to the third example are tables stored as the feedback table 17 in the base station device 1, and as the feedback table 26 in the terminal device 2. The feedback tables 17-3, 26-3 illustrate an example in which eight CBs of CB-1 to CB-8 form a TB of a transmission unit.

When eight CBs of CB-1 to CB-8 are a transmission unit, TB, and the "HARQ-ACK payload" is 4 bits, the number of respective Indexes is as follows. That is, one in the layer of "Level-1" in which a retransmission CBG is not present, eight in the layer "Level-2" in which eight retransmission CBGs each including one retransmission CB are present, and one in the layer "Level-4" in which all TBs including retransmission CBs are a retransmission CBG. Therefore, optimization of design of a CBG in the layer of "Level-3" including six Indexes is to be related to the usability of the feedback table.

When eight CBs of CB-1 to CB-8 are a transmission unit, TB, and the "HARQ-ACK payload" is 4 bits, six kinds of Indexes are present in "Level-3" as illustrated in FIG. 9. Namely, in addition to an index, "HARQ-ACK bit" "Index 3-1" indicating that CB-1 to CB-4 are included in a CBG subject to retransmission, six kinds of indexes of "Index 3-2" to "Index 3-6" are present.

Moreover, in the feedback tables 17-3, 26-3, a not illustrated layer that corresponds to none of "Level-1" to "Level-2" and "Level-3" described above, and in which all of CB-1 to CB-8 are subject to retransmission and included in a CBG subject to retransmission is a layer of "Level-4". The layer of "Level-4" has only one type of status in which all of CB-1 to CB-8 are included in a CBG subject to retransmission. In the feedback tables 17-3, 26-3, to this one type of status, "HARQ-ACK bit" "Index 4-1" is assigned.

Specifically, in the feedback tables 17-3, 26-3, for example, in a TB corresponding to "Index 3-1" of "Level-3" indicated in the first row in FIG. 9, CB-1 to CB-8 are "NAK", "NAK", "ACK", . . . , "ACK", respectively. When it is in this ACK/NAK pattern, because adjacent CB-1 to CB-4 are grouped as a CBG subject to retransmission, CB-1 to CB-4 are retransmitted.

Furthermore, in the feedback tables 17-3, 26-3, for example, in a TB corresponding to "Index 3-6" of "Level-3" indicated in the nineteenth row in FIG. 9, CB-1 to CB-8 are "NAK", "ACK", . . . , "ACK", "NAK", "ACK", "ACK", respectively. When it is in this ACK/NAK pattern, because CB-1 and adjacent CB-6 to CB-8 are grouped as a CBG subject to retransmission, CB-1 and CB-6 to CB-8 are retransmitted.

Moreover, in the feedback tables 17-3, 26-3, for example, in a TB corresponding to "Index 4-1" of "Level-4" indicated in the twenty-second row in FIG. 9, CB-1 to CB-8 are "ACK", "ACK", "NAK", "ACK", . . . , "ACK", "NAK", respectively. When it is in this ACK/NAK pattern, because all of adjacent CB-1 to CB-8 are grouped as a CBG subject to retransmission, all of adjacent CB-1 to CB-8 are retransmitted.

Also in FIG. 9, distinction between "ACK" and "NAK" of each of CB-1 to CB-8 in the feedback table 17-3 can be omitted, similarly to FIG. 4 and FIG. 6. When the distinction is omitted, in the feedback table 17-3, one TB having a CBG including CB-1 to CB-4 corresponds to "Index 3-1". "Index 3-2" to "Index 3-6", and "Index 4-1" are also the same.

Retransmission Rate in Example of Third Feedback Table

FIG. 10 illustrates a retransmission rate in the example of the third feedback table. In FIG. 10, it is assumed that eight CBs of CB-1 to CB-8 form a TB of a transmission unit, and that the number of bits of the "HARQ-ACK payload" is four. Total transmission rates of cases in which a retransmission CBG unit in "Level-3" is two (refer to a column of "Multilevel HARQ-ACK" in FIG. 10) and 4 (refer to a column of "Suboptimal Multilevel HARQ-ACK" in FIG. 10) are compared. It is then found that "Suboptimal Multilevel HARQ-ACK" is improved to be better by about 3.19%.

Processing of Optimal Multilevel CBG search

Processing of optimal multilevel CBG search is processing of searching for a CBG of "Multilevel HARQ-ACK" that minimizes the retransmission rate in a TB. The "HARQ-ACK payload" is N bits (N is a predetermined positive integer), and the TB, which is a transmission unit, includes M pieces of CBs (M is a predetermined positive integer). It is noted that M≥N.

First, a subset g including $2^N$ pieces of vectors is selected from a set G including $2^M$ pieces of vectors, a component of which is 0 or 1. That is, g⊆G. Therefore, the number of combinations in selecting the subset g from the set G is as in Equation (4) below. This is because the first vector in the subset g is always 1-vector, the entire components of which is 1 indicating that all are ACK in the TB. On the other hand, the last vector in the subset g is always 0-vector, the entire component of which are 0 indicating that all are NAK in the TB.

$$\binom{2^M - 2}{2^N - 2} \quad (4)$$

The subset g is expressed in a matrix as Equation (5) below to cover all combinations of ACK/NAK in the TB.

$$g = \begin{bmatrix} g_0 \\ g_1 \\ \vdots \\ g_{2^N-2} \\ g_{2^N-1} \end{bmatrix} = \begin{bmatrix} 1 & 1 & \cdots & 1 \\ n_{1,0} & n_{1,1} & \cdots & n_{1,M-1} \\ \vdots & \vdots & \ddots & \vdots \\ n_{2^N-2,0} & n_{2^N-2,1} & \cdots & n_{2^N-2,M-1} \\ 0 & 0 & & 0 \end{bmatrix} \quad (5)$$

In above Equation (5), respective components $n_{k,l}$ (k=1, ..., $2^N$−2, l=0, ..., M−1) of a matrix g are 0 when included in a CBG subject to retransmission, and are 1 when not included therein. When a vector $g_k$=[$n_{k,0}, n_{k,1}, \ldots, n_{k,M-1}$], for example, in the example illustrated in FIG. 9, each TB corresponding to "Index 3-1" is expressed as vector $g_k$=[0, 0, 0, 0, 1, 1, 1, 1]. Moreover, Each TB corresponding to "Index 3-3" is expressed as vector $g_k$=[1, 1, 0, 0, 0, 0, 1, 1]. Note that 1-vector $g_0$ does not have a CBG subject to retransmission, and as for 0-vector $g_*$ (where $*=2^N-1$), entire components are included in CBG subject to retransmission.

It is noted that the subset g is useful to mathematically express a multilevel group. Processing of optimal multilevel CBG search in FIG. 11 described later is aimed to find the best multilevel group.

Furthermore, the set G is $2^M$ pieces of vectors, each of which has M pieces of components, and is mathematically expressed by a matrix of Equation (6) below. It is noted that respective components $m_{i,l}$ (i=1, ..., $2^N$−1, l=0, ..., M−1) of a matrix G are 0 when corresponding CBs are needed to be retransmitted, and are 1 when not needed to be retransmitted. Generally, a vector $G_i$ indicates an i-th combination of respective M pieces of CBs in a TB.

$$G = \begin{bmatrix} G_0 \\ G_1 \\ \vdots \\ G_{2^M-1} \end{bmatrix} = \begin{bmatrix} m_{0,0} & m_{0,1} & \cdots & m_{0,M-1} \\ m_{1,0} & m_{1,1} & \cdots & m_{1,M-1} \\ \vdots & \vdots & \ddots & \vdots \\ m_{2^M-1,0} & m_{2^M-1,1} & \cdots & m_{2^M-1,M-1} \end{bmatrix} = \begin{bmatrix} 1 & 1 & \cdots & 1 \\ 0 & 1 & \cdots & 1 \\ \vdots & \vdots & \ddots & \vdots \\ 0 & 0 & \cdots & 0 \end{bmatrix} \quad (6)$$

The vector $g_k$ is suitable to indicate the vector $G_i$. An inner product $f(g_k, G_i)$ of the vector $g_k$ and the vector $G_i$ is defined as a function expressed by Equation (7) below.

$$f(g_k, G_i) = \begin{cases} 1 & \text{if } g_k \cdot G_i^T = \Delta_k \\ 0 & \text{otherwise } 0 \end{cases} \text{ where } \Delta_k = \sum_{l=0}^{M-1} N_{k,l} \quad (7)$$

In above Equation (7), $f(g_k, G_i)=1$ means that the vector $g_k$ is a candidate of the vector $G_i$. When plural vectors $g_k$ are present as a candidate of the vector $G_i$, one vector $g_k$ is selected as the candidate based on a minimization standard expressed by Equation (8) below relating to the retransmission rate of a CB.

$$Pr_{k,i}^{(ReTx)} = \frac{M - \Delta_k}{M} \cdot p^{M-\Lambda_i} \cdot (1-p)^{\Lambda_i} \quad (8)$$

In above Equation (8), p is an "error rate of a CB" and is, for example, 0.1. Moreover, $\Lambda_i$ is defined by Equation (9) below.

$$\Lambda_i = \sum_{l=0}^{M-1} m_{i,l} \quad (9)$$

Herein, $g_{k \leftarrow i}$ is newly introduced as a symbol constituting a new subset g' in which the selected vector $g_k$ indicates the vector $G_i$, and g⊆'g is satisfied. The new subset g' is updated when the retransmission rate of a CB is further reduced after calculation of the inner product expressed by above Equation (7).

It is noted that all of the vectors $G_i$ respectively indicated by the related vector $g_{k \leftarrow i}$. Thus, it is guaranteed that N bits of the "HARQ-ACK payload" indicates all combinations of HARQ-ACK of M pieces of CBs included in a TB of a transmission unit, in a HARQ-ACK system based on the multilevel CBG.

The best subset g of the set G is found by a comprehensive search algorithm based on a minimization standard relating to the retransmission rate of an arbitrary CB. The search formula is expressed as Equation (10) below, or similar Equation (11) below.

$$\min_{g' \subseteq g} \sum_{i=1}^{2^M-1} f(g_{k \leftarrow i}, G_i) \cdot \frac{M - \Delta_k}{M} \cdot p^{M-\wedge i} \cdot (1-p)^{\wedge i} \quad (10)$$

$$\min_{g' \subseteq g} \sum_{i=1}^{2^M-1} f(g_{k \leftarrow i}, G_i) \cdot Pr_{k,i}^{(ReTx)} \quad (11)$$

Search Algorithm Using Correlation Coefficient

In the above, an element or a variable is IID. Actually, most cases are not IID. Generally, the strength of a correlation between variables is expressed by a correlation coefficient expressed by Equation (12) below. In Equation (12) below, Cov(x, y) is a covariance of x and y, and v(x), v(y) are variances of x, y, respectively.

$$\rho(x, y) = \frac{\text{Cov}(x, y)}{\sqrt{v(x) \cdot v(y)}} \quad (12)$$

Therefore, the correlation of variable in the vector $g_k$ is expressed by a matrix of Equation (13) below. $x_{k,i}$ is a probability variable of CB-I (i is a positive integer between 1 and the number of CBs constituting a TB) in a CBG-based HARQ-ACK system. When a reception signal $x_{k,i}$ and a reception signal $x_{k,l}$ in CB-i are independent of each other, $\rho(x_{k,i}, x_{k,l})=0$, and when not independent of each other, $\rho(x_{k,i}, x_{k,l}) \neq 0$.

$$\Gamma(g_k) = \begin{bmatrix} \rho(x_{k,0}, x_{k,0}) & \rho(x_{k,0}, x_{k,1}) & \cdots & \rho(x_{k,0}, x_{k,M-1}) \\ \rho(x_{k,1}, x_{k,0}) & \rho(x_{k1}, x_{k,1}) & \cdots & \rho(x_{k,1}, x_{k,M-1}) \\ \vdots & \vdots & \ddots & \vdots \\ \rho(x_{k,M-1}, x_{k,0}) & \rho(x_{k,-1}, x_{k,1}) & \cdots & \rho(x_{k,M-1}, x_{k,M-1}) \end{bmatrix} \quad (13)$$

In the processing of optimal multilevel CBG search, for a CBG in which plural vectors $g_k$ are candidates, the probability $Pr_{k,j}^{(ReTx)}$ expressed by above Equation (8) of which are the same, all correlation coefficients in the CBG are calculated based on above Equation (13). Furthermore, one vector $g_k$ is selected based on a minimization standard defined by Equation (14) below.

$$\Delta_{\Gamma(g_k)} = \sum_{i=0}^{M-1} \sum_{l=0}^{M-1} (1 - n_{k,i})(1 - n_{k,l}) \cdot \rho(x_{k,i}, x_{k,l}) \quad (14)$$

Flowchart of Processing of Optimal Multilevel CBG Search

Figure 11:
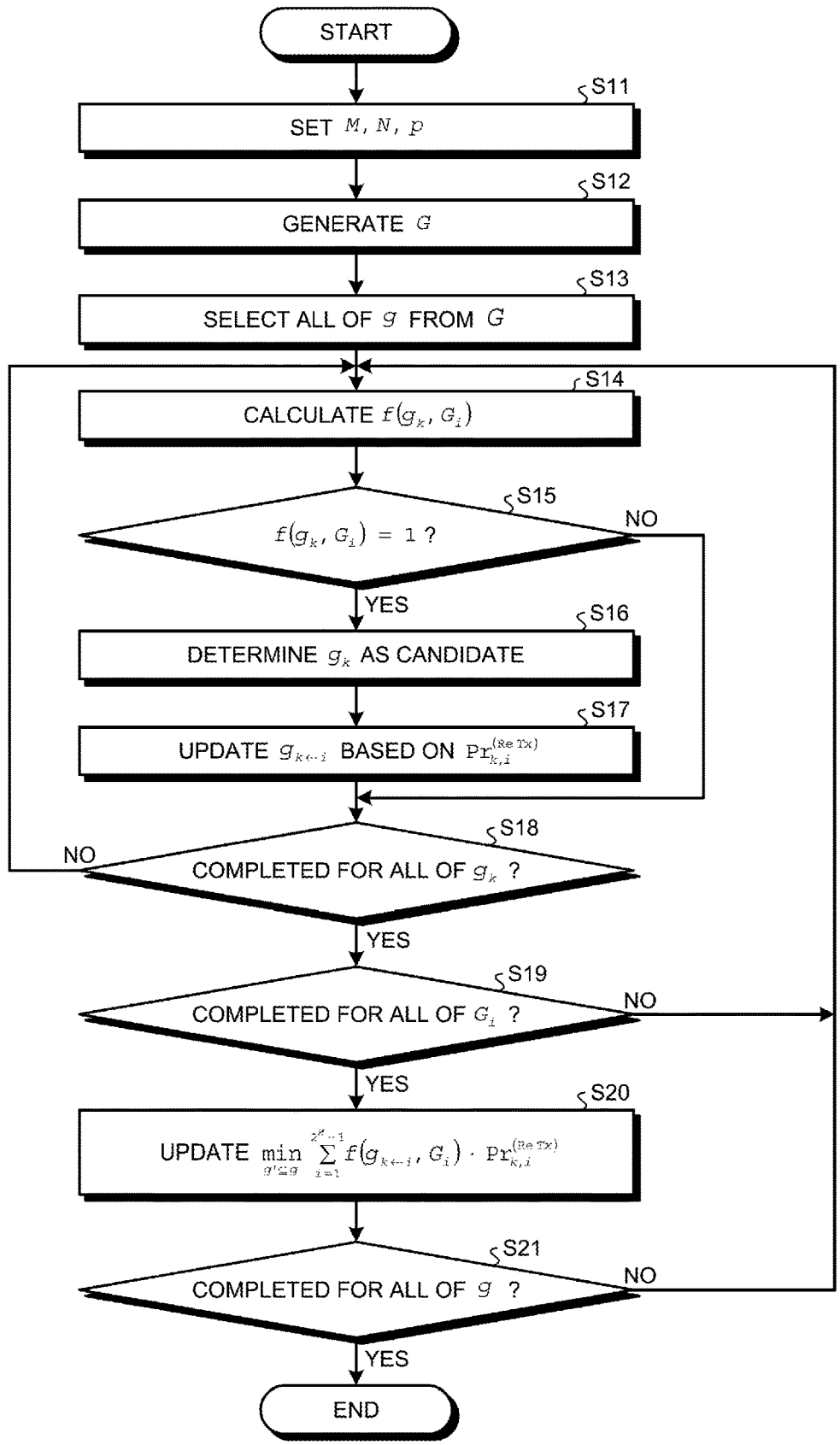
FIG. 11 is a flowchart illustrating an example of processing of optimal multilevel CBG search.

FIG. 11 is a flowchart illustrating an example of the processing of optimal multilevel CBG search. The processing illustrated in FIG. 11 is performed by a processing device, such as a central processing unit (CPU), according to an execution instruction. In the processing illustrated in FIG. 11, the "HARQ-ACK payload" is N bits (N is a predetermined positive integer), and a TB of a transmission unit includes M pieces of CBs (M is a predetermined positive integer). It is noted that M≥N.

First, at step S11, the processing device sets the number of CBs included in a TB of a transmission unit: M, the number of bits of the HARQ-ACK payload": N, and the "error rate of a CB": p. Next, at step S12, the processing device generates the set G expressed by above Equation (6).

Next, at step S13, the processing device selects all of the subsets g from the set G generated at step S12.

Next, at step S14, the processing device selects one vector $g_k$ and one vector $G_i$ for the set G generated at step S12 and the subset g selected at step S13. Furthermore, at step S14, the processing device calculates the inner product $f(g_k, G_i)$ of the selected vector $g_k$ and vector $G_i$.

Next, at step S15, the processing device determines whether the inner product calculated at step S14 is $f(g_k, G_i)=1$. When the inner product calculated at step S14 is $f(g_k, G_i)=1$ (step S15: YES), the processing device proceeds the processing to step S16. On the other hand, when the inner product calculated at step S14 is not $f(g_k, G_i)=1$ (step S15: NO), the processing device proceeds the processing to step S18.

At step S16, the processing device regards the vector $g_k$ that is determined as YES at step S15 as a candidate. Next, at step S17, the vector $g_{k \leftarrow i}$ is updated based on above Equation (8). Next, at step S18, the processing device determines whether the processing at steps S14 to S17 has been completed for all of the vectors $g_k$ of the subset g of the set G selected at step S13. When the processing at steps S14 to S17 has been completed for all of the vectors $g_k$ of the subset g of the set G selected at step S13 (step S18: YES), the processing device proceeds the processing to step S19. On the other hand, when the processing at steps S14 to S17 has not been completed for all of the vectors $g_k$ of the subset g of the set G selected at step S13 (step S18: NO), the processing device returns the processing to step S14. When the processing is returned from step S18 to step S14, the processing device selects the vector $g_k$ that is not the vector $g_k$ previously processed, but the vector $g_k$ that has not been processed.

At step S19, the processing device determines whether the processing at steps S14 to S18 has been finished for all of the vectors $G_i$ of the set G generated at step S12. When the processing at steps S14 to S18 has been finished for all of the vectors $G_i$ of the set G generated at step S12 (step S19: YES), the processing device proceeds the processing to step S20. On the other hand, when the processing at steps S14 to S18 has not been finished for all of the vectors $G_i$ pf the set G generated at step S12 (step S19: NO), the processing device shifts the processing to step S14. When the processing shifted from step S19 to step S14, the processing device selects the vector $G_i$ that is not the vector $G_i$ previously processed, but the vector $G_i$ that has not been processed.

At step S20, the processing device updates a result obtained by summing up products of an inner product $f(g_{k \leftarrow i}, G_i)$ and the probability $Pr_{k,j}^{(ReTx)}$ expressed by above Equation (10) or Equation (11) for the indexes i of vectors from 1 to $2^M-1$. At step S21, the processing device determines whether the processing at steps S14 to S20 has been finished for all of the subsets g selected at step S13. When the processing at steps S14 to S20 has been finished for all of the subsets g selected at step S13 (step S21: YES), the processing device ends the processing of optimal multilevel CBG search. On the other hand, when the processing at steps S14 to S20 has not been finished for all of the subsets g selected at step S13 (step S21: NO), the processing device returns the processing to step S14.

One Example of Processing Result of Optimal Multilevel CBG Search

Figure 12:
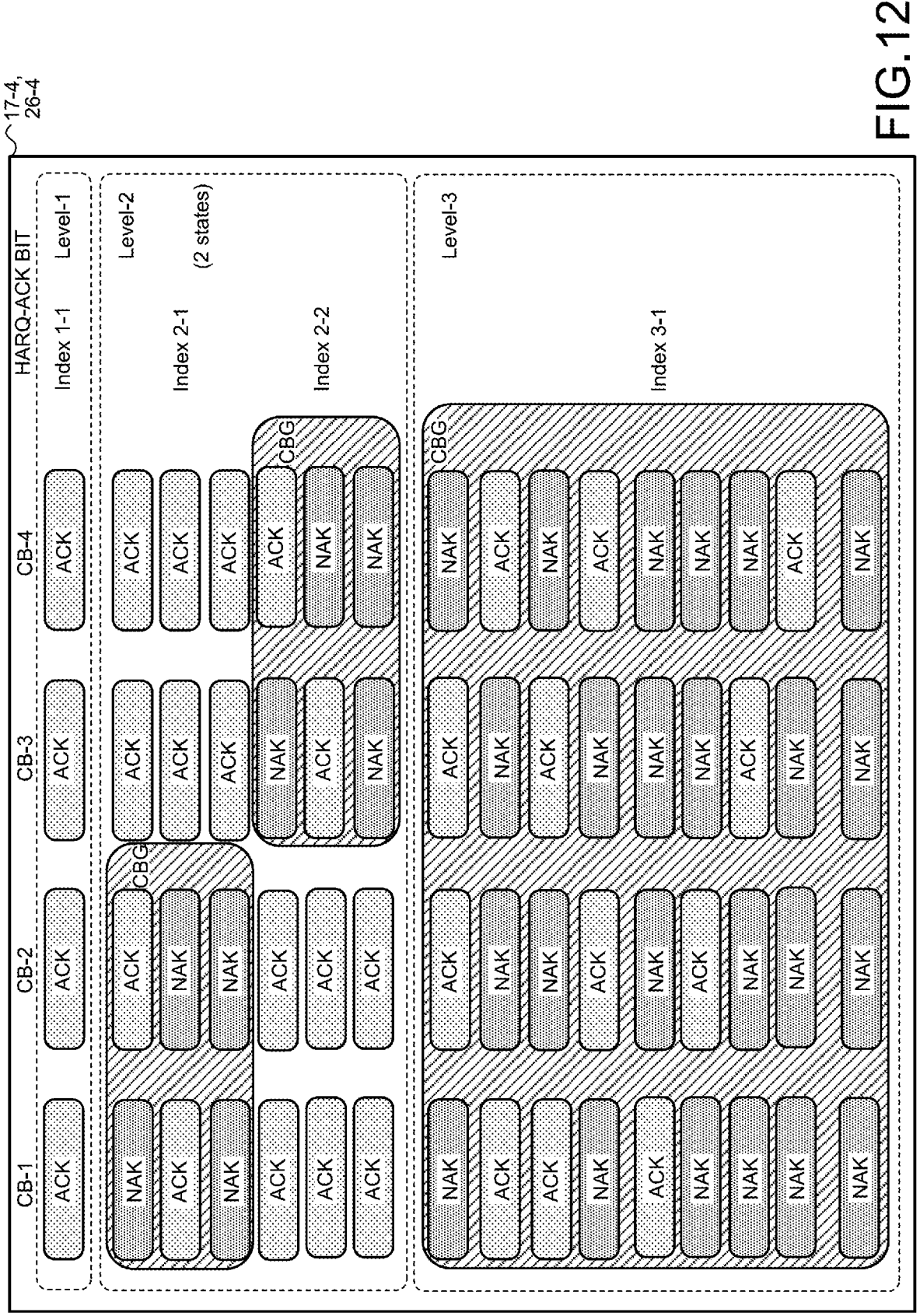
FIG. 12 illustrates an example of a result of the processing of the optimal multilevel CBG search.

FIG. 12 illustrates an example of a result of the processing of the optimal multilevel CBG search. FIG. 12 illustrates feedback tables 17-4, 26-4 generated as a result of the processing of optimal multilevel CBG search. The feedback tables 17-4, 26-4 are tables stored as the feedback table 17 in the base station device 1, and as the feedback table 26 in the terminal device 2.

The feedback tables 17-4, 26-4 are feedback tables that are formed by the processing of optimal multilevel CBG search illustrated in FIG. 11 for a TB having four CBs and the "HARQ-ACK payload" of 2 bits (or 3 bits). As a result of the processing of optimal multilevel CBG search, in the feedback tables 17-4, 26-4 optimized for the TB having four CBs and the "HARQ-ACK payload" of 2 bits (or 3 bits), layers of "Level-1" to "Level-3" are formed. "Level-1" has one status, "Index-1". "Level-2" has two statuses, "Index 2-1" and "Index 2-2". "Level-3" has one status, "Index 3-1".

In the feedback tables 17-4, 26-4, for example, "Level-2" has an ACK/NAK pattern in which two NAK are included in one TB, and based on the notation with the vector $g_k$ described above, six kinds of the vectors $g_k$ are present. Namely, vector $g_k$=[0, 0, 1, 1], [1, 1, 0, 0], [0, 1, 1, 0], [1, 0, 0, 1], [0, 1, 0, 1], [1, 0, 1, 0].

The vector $g_k$ is not IID, and there is a correlation among variables. Therefore, two vectors $g_k$=[0, 0, 1, 1], [1, 1, 0, 0] are selected according to the strength in the correlation between variables, based on the minimization standard defined by above Equation (14).

Specifically, in the feedback tables 17-4, 26-4, for example, in a TB corresponding to "Index 1-1" of "Level-1" indicated in the first row, all of CB-1 to CB-4 are "ACK". When it is in this ACK/NAK pattern, because adjacent CB-1 to CB-4 are grouped as a CBG subject to retransmission, CB-1 to CB-4 are retransmitted.

Moreover, in the feedback tables 17-4, 26-4, for example, in a TB corresponding to "Index 2-1" of "Level-2" indicated in the second row, CB-1 to CB-4 are "NAK", "ACK", "ACK", "ACK", respectively. When it is in this ACK/NAK pattern, because adjacent CB-1 and CB-2 are grouped as a CBG subject to retransmission, CB-1 and CB-2 are retransmitted.

Furthermore, in the feedback tables 17-4, 26-4, for example, in a TB corresponding to "Index 3-1" of "Level-3" indicated in the eighth row, CB-1 to CB-4 are "NAK", "ACK", "ACK", "NAK", respectively. When it is in this ACK/NAK pattern, because all of adjacent CB-1 to CB-4 are grouped as a CBG subject to retransmission, all of CB-1 to CB-4 are retransmitted.

In FIG. 12 also, similarly to FIG. 4, FIG. 6, and FIG. 9, distinction between "ACK" and "NAK" of each of CB-1 to CB-4 can be omitted. When the distinction is omitted, in the feedback table 17-4, one TB having a CBG including CB-1 to CB-2 corresponds to "Index 2-1". "Index 2-2" and "Index 3-1" are also the same.

Retransmission Rate in One Example of Processing Result of Optimal Multilevel CBG Search FIG. 13 illustrates a retransmission rate in one example of a processing result of the optimal multilevel CBG search. In FIG. 13, $Pr_{CBG\ Error}$ and $Pr_{ReTX}$ are compared for each number of retransmission CBs (# $M_{CB}$) in a CBG between a comparison method, "Bit-mapping HARQ-ACK" the "HARQ-ACK payload" is 4 bits) and "Multilevel HARQ-ACK" (the "HARQ-ACK payload" is 2 bits), which is a processing result of the optimal multilevel CBG search.

As illustrated in FIG. 13, while the total retransmission rate $Pr_{ReTX}$ of the Bit-mapping HARQ-ACK" is 0.1, the retransmission rate $Pr_{ReTX}$ of the "Multilevel HARQ-ACK" is 0.19 to be higher in retransmission rate by 9%. That is, according to the example of the fourth feedback table of the embodiment, while suppressing the retransmission rate to be worsened only by 9%, the number of bits of the "HARQ-ACK payload" can be reduced from 4 bits to 2 bits by 50%. Therefore, while suppressing worsening of the transmission rate, the number of bits of the "HARQ-ACK payload" to be an overhead of communicated data can be reduced.

Note that when the number of bits of the "HARQ-ACK payload" is 3 bits in the processing of the optimal multilevel CBG search, the feedback tables 17-2, 26-2 in FIG. 6 became the retransmission rate in the example of the second feedback table in FIG. 7, to be optimized.

The CBG for retransmission formed by the algorithm of the processing of the optimal multilevel CBG search according to the embodiment described above is useful for constructing a HARQ-ACK system of an optimal multilevel CBG having the arbitrary number of CBs in a TB and the "HARQ-ACK payload". The optimal multilevel CBG according to the above embodiment can reduce the "HARQ-ACK payload" to be an overhead of communicated data, while suppressing worsening of the retransmission rate.

In the above embodiment, the case of retransmission from the base station device 1 to the terminal device 2 has been described. To summarize, new transmission is transmitted in TB unit from the base station device 1 to the terminal device 2. The terminal device 2 receives the TB, and detects whether there is an error in CB unit. Meanwhile, the feedback table (CBG information) is searched, and the CBG information is transmitted from the terminal device 2 to the base station device 1. The CBG information is transmitted, for example, by using the control channel (PUCCH). The base station device 1 generates a new TB (including a retransmission CBG and a new CBG) based on the CBG information, and performs retransmission and new transmission. Moreover, at the same time, the base station device 1 transmits a state of the retransmission CBG and the new CBG, for example, by the PDCCH. In short, because the retransmission and the new transmission are both present mixedly, it is notified from the terminal device 2 to the base station device 1.

Moreover, the present invention is applicable also to a case in which retransmission is performed from the terminal device to the base station device 1. This case will be described briefly. First, new transmission is transmitted in TB unit from the terminal device 2 to the base station. The base station device 1 receives the TB, performs detection per CB, and determined whether there is an error. Meanwhile, the feedback table (CBG information) is searched, and the CBG information is transmitted from the base station device 1 to the terminal device 2. The CBG information is transmitted, for example, by using the control channel (PDCCH). The terminal device 2 newly generates a TB (including retransmission CBG and new CBG) based on the CBG information, and performs retransmission and new transmission. At the same time, the terminal device 2 transmits a state of the retransmission CBG and the new CBG by the PUCCH. In short, because the retransmission and the new transmission are both present mixedly, it is notified from the terminal device 2 to the base station device 1.

As described above, it is applicable also when retransmission is performed from the terminal device 2 to the base station device 1. According to the above embodiment, the optimal multilevel CBG can reduce the "HARQ-ACK payload" to be an overhead of communicated data, while suppressing worsening of the retransmission rate.

Other Embodiments

In the embodiment described above, a new system that indicates how to group multilevel CBGs based on the HARQ-ACK is suggested. Moreover, a configuration of a grouping mode is important in grouping of multilevel CBGs based on the HARQ-ACK. Generally, the grouping mode is defined based on a static, a semi-static, or a dynamic method.

If conditions for the HARQ system are very stable, a static grouping method is preferable. For example, when a data traffic amount is constant, as a result, the number of CBs in a TB is to be constant. Meanwhile, a reception error that occurs among different CBs is IID. In this case, the grouping mode is desirable not to be changed, but to be the same.

Furthermore, if the conditions for the HARQ system change in time, but the change is sufficiently slow, a semi-static grouping method is preferable. For example, a state of data traffic in a shopping mall varies among morning, daytime, and nighttime. In such a case, the multilevel CBG is desirable to be defined to match such variations. The configuration therefor can be executed by a radio resource control (RRC) mode.

Moreover, if conditions for the HARQ system rapidly change, a dynamic grouping method is preferable. For example, a 5G traffic related to ultra-reliable and low latency communications (URLLC) often occurs suddenly, and immediate transmission is preferable (1-msec delay and $10^{-5}$ BLER are required for new 5G wireless communication).

In such a case, traffic data of an enhance mobile broadband (eMBB) transmitted through a band necessarily be overloaded by URLLC traffic data. Therefore, a CB transmitting the eMBB traffic is subjected to heavy damage by an error pattern having a high correlation. In such a situation, a special CBG constructed in the HARQ-ACK system of the multilevel CBG enables to reduce retransmission load. For example, one CBG or multiple CBG are determined in advance to be used for URLLC overload. This enables to limit a retransmission amount of the eMBB traffic. This special CBG is defined by an L1/L2 control mode.

Program for Processing of Optimal Multilevel CBG Search

Figure 14:
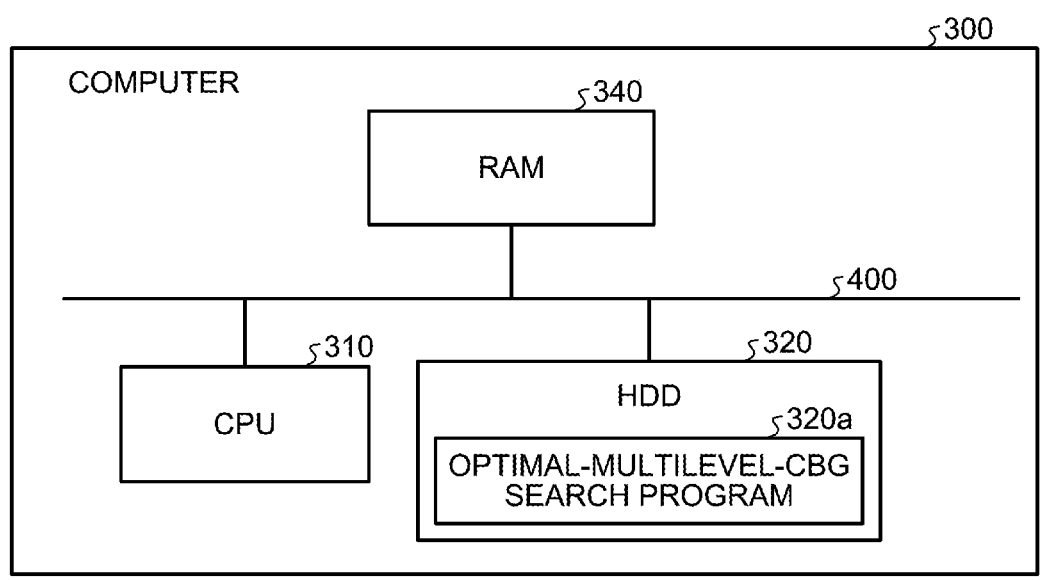
FIG. 14 illustrates a computer that executes an optimal-multilevel-CBG search program.

Moreover, as for a program for processing of optimal multilevel CBG search described in the above embodiment, a program prepared in advance is executed by a computer system, such as a personal computer and a workstation. FIG. 14 illustrates a computer that executes a program for processing of the optimal multilevel CBG search.

As illustrated in FIG. 14, a computer 300 includes a CPU 310, a hard disk drive (HDD) 320, and a random access memory (RAM) 340. These components 310 to 340 are connected with one another through a bus 400.

The HDD 320 stores an optimal multilevel-CBG-search program 320a in advance. Note that respective functions of the optimal multilevel-CBG-search program 320a may be separated to modules appropriately.

Moreover, the HDD 320 stores various kinds of data. For example, the HDD 320 stores an operating system (OS) and various kinds of data. The CPU 310 reads the optimal multilevel-CBG-search program 320a from the HDD 320, to execute it.

The optimal multilevel-CBG-search program 320a is not necessarily required to be stored in the HDD 320 from the beginning. For example, the program is stored in a "portable physical medium" to be inserted into the computer 300, such as a flexible disk (FD), a compact disk read-only memory (CD-ROM), a digital versatile disk (DVD), a magneto-optical disk, and an IC card. The computer 300 may be configured to read the program from these media, to execute it.

Furthermore, the program is stored in "another computer (or a server)" or the like connected to the computer 300 through a public network, the Internet, a local area network (LAN), a wide area network (WAN), and the like. The computer 300 may be configured to read the program from these, to execute it.

The HARQ feedback considering the retransmission efficiency and the number of bits to be used in the HARQ feedback is enabled.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
a storage that stores a plurality of pieces of identification information each of which corresponds to any of a plurality of groups, each of the plurality of groups indicating unit data subject to retransmission out of predetermined number of unit data included in transmission data to be transmitted to a terminal device, the plurality of groups including a first group to which a first number of pieces of unit data belong and a second group to which a second number of pieces of unit data belong, the second number of pieces of unit data being larger than the first number of pieces of unit data, the first group including first unit data included in the predetermined number of unit data, the second group including the first unit data and a second unit data included in the predetermined number of unit data, wherein the plurality of groups include a group in which 0 pieces of unit data are included, a group in which number larger than 0 and smaller than the predetermined number of unit data are included, and a group in which the predetermined number of unit data are included;
a receiver that receives, from the terminal device, identification information included in the plurality of pieces of identification information and corresponding to transmission data transmitted to the terminal device;
a communication controller that determines a retransmission group among the plurality of groups by referring to the storage; and
a transmitter that transmits all pieces of unit data included in the determined retransmission group that is determined by the communication controller, to the terminal device.

2. The base station device according to claim 1, wherein the base station device notifies, to the terminal device, of a mixed state of unit data subject to retransmission and unit data of new transmission that are included in the transmission data to be transmitted to the terminal device by a predetermined control channel.

3. A base station device comprising:
a storage that stores a pattern of decoding result of predetermined number of unit data included in reception data that is received from a terminal device, and a plurality of pieces of identification information each of which corresponds to any of a plurality of groups, each of the plurality of groups indicating unit data subject to retransmission out of the predetermined number of unit data, the plurality of groups including a first group to which a first number of pieces of unit data belong and a second group to which a second number of pieces of unit data belong, the second number of pieces of unit data being larger than the first number of pieces of unit data, the first group including first unit data included in the predetermined number of unit data, the second group including the first unit data and a second unit data included in the predetermined number of unit data, wherein the plurality of groups include a group in which 0 pieces of unit data are included, a group in which number larger than 0 and smaller than the predetermined number of unit data are included, and a group in which the predetermined number of unit data are included;

a processor that determines whether decoding of each unit data included in reception data received from the terminal device succeeds, that refers to the storage based on the pattern of decoding result of each unit data to generate identification information corresponding to the pattern of decoding result; and a transmitter that transmits the identification information generated by the processor to the terminal device.

4. A terminal device comprising:

a storage that stores a plurality of pieces of identification information each of which corresponds to any of a plurality of groups, each of the plurality of groups indicating unit data subject to retransmission out of predetermined number of unit data included in transmission data to be transmitted to a base station device, the plurality of groups including a first group to which a first number of pieces of unit data belong and a second group to which a second number of pieces of unit data belong, the second number of pieces of unit data being larger than the first number of pieces of unit data, the first group including first unit data included in the predetermined number of unit data, the second group including the first unit data and a second unit data included in the predetermined number of unit data, wherein the plurality of groups include a group in which 0 pieces of unit data are included, a group in which number larger than 0 and smaller than the predetermined number of unit data are included, and a group in which the predetermined number of unit data are included;

a receiver that receives, from the base station device, identification information included in the plurality of pieces of identification information and corresponding to transmission data transmitted to the base station device;

a communication controller that determines a retransmission group among the plurality of groups by referring to the storage; and a transmitter that transmits all pieces of unit data included in the determined retransmission group that is determined by the communication controller, to the base station device.

5. The terminal device according to claim 4, wherein the terminal device notifies, to the base station device, of a mixed state of unit data subject to retransmission and unit data of new transmission that are included in the transmission data to be transmitted to the base station device by a predetermined control channel.

6. The base station device according to claim 1, wherein the pieces of unit data are code blocks.

7. The terminal device according to claim 4, wherein the pieces of unit data are code blocks.

* * * * *